United States Patent
Kim

(10) Patent No.: US 10,203,831 B2
(45) Date of Patent: Feb. 12, 2019

(54) DISPLAY DEVICE WITH TOUCH FUNCTION

(71) Applicant: LG Display Co., Ltd., Seoul (KR)

(72) Inventor: DongSup Kim, Incheon (KR)

(73) Assignee: LG Display Co., Ltd., Seoul (KR)

( * ) Notice: Subject to any disclaimer, the term of this patent is extended or adjusted under 35 U.S.C. 154(b) by 130 days.

(21) Appl. No.: 14/983,916

(22) Filed: Dec. 30, 2015

(65) Prior Publication Data

US 2017/0090627 A1     Mar. 30, 2017

(30) Foreign Application Priority Data

Sep. 30, 2015    (KR) .......................... 10-2015-0137753

(51) Int. Cl.
*G06F 3/041*        (2006.01)
*G06F 3/047*        (2006.01)

(52) U.S. Cl.
CPC ............ *G06F 3/047* (2013.01); *G06F 3/0412* (2013.01); *G06F 2203/04107* (2013.01); *G06F 2203/04111* (2013.01)

(58) Field of Classification Search
None
See application file for complete search history.

(56) References Cited

U.S. PATENT DOCUMENTS

| | | | |
|---|---|---|---|
| 2010/0013789 A1 | 1/2010 | Chung et al. | |
| 2010/0085326 A1* | 4/2010 | Anno | ..................... G06F 3/044 345/174 |
| 2011/0141042 A1* | 6/2011 | Kim | ................... G02F 1/13338 345/173 |
| 2014/0333582 A1* | 11/2014 | Huo | ................... G02F 1/13338 345/174 |
| 2014/0362042 A1* | 12/2014 | Noguchi | ............... G06F 3/0412 345/174 |

FOREIGN PATENT DOCUMENTS

| | | |
|---|---|---|
| CN | 101320185 A | 12/2008 |
| CN | 101377596 A | 3/2009 |

OTHER PUBLICATIONS

Office Action issued in Chinese Patent Application No. 201511020480.9 dated Dec. 3, 2018.

* cited by examiner

*Primary Examiner* — Stephen T Reed
(74) *Attorney, Agent, or Firm* — Morgan, Lewis & Bockius LLP

(57) ABSTRACT

A display device with a touch function is disclosed. The display device includes a substrate, a first line area extending in a first direction on the substrate, and a second line area extending in a second direction different from the first direction on the substrate. Also included are first line on a first surface of the substrate, extending in the first direction in the first line area, and a second line on the first surface of the substrate, extending in the second direction in the second line area and crossing the first line. A first touch electrode is provided on a second surface of the substrate, extending in the first direction in the first line area, and a second touch electrode is provided on the second surface of the substrate, extending in the second direction in the second line area and crossing the first touch electrode.

20 Claims, 16 Drawing Sheets

DISPLAY DEVICE WITH TOUCH FUNCTION

This application claims priority from and the benefit of Korean Patent Application Number 10-2015-0137753 filed on Sep. 30, 2015, which is hereby incorporated by reference for all purposes as if fully set forth herein.

BACKGROUND OF THE INVENTION

Field of the Invention

The present invention relates to a display device, and more particularly, a display device with a touch function.

Description of Related Art

In response to the development of the information society, there is an increasing demand for various types of display devices capable of displaying images. Currently, various display devices, such as liquid crystal display (LCD) devices, plasma display panels (PDPs) and organic light-emitting diode (OLED) display devices, are in common use.

Certain display devices are able to provide a touch-based user interface enabling users to intuitively and conveniently input data or instructions directly to the devices, without having to use conventional input systems, such as buttons, a keyboard, or a mouse. However, such display devices incorporate a touch panel to enable the touch function and as a result has a drawback in that the touch panel may cause a reduction in the aperture ratio and the transmittance ratio.

SUMMARY

Accordingly, the present invention is directed to a display device that substantially obviates one or more of the problems due to limitations and disadvantages of the related art.

An object of the present invention is to provide a display device with a touch function that has an improved aperture ratio and/or an improved transmittance ratio.

Another object of the present invention is to provide a display device in which reflectivity of inner or outer lights is reduced, and light leakage or color mixture between pixels is prevented or mitigated.

Still another object of the present invention is to provide a display device with high luminance and improved image quality.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a display device, comprises: a substrate having a first surface and a second surface; a first line area extending in a first direction on the substrate; a second line area extending in a second direction different from the first direction on the substrate; a first line on the first surface of the substrate and extending in the first direction in the first line area; a second line on the first surface of the substrate, extending in the second direction in the second line area, and crossing the first line; a pixel on the first surface of the substrate at an intersection of the first line and the second line; a first touch electrode on the second surface of the substrate and extending in the first direction in the first line area; and a second touch electrode on the second surface of the substrate, extending in the second direction in the second line area, and crossing the first touch electrode.

In another aspect, a display device comprises: a substrate having a first surface and a second surface opposite the first surface; a plurality of first line areas each extending in a first direction on the substrate; a plurality of second line areas each extending in a second direction different from the first direction on the substrate; a plurality of pixel areas on the substrate, each defined by two of the first line areas and two of the second line areas, and including a light emitting area and a circuit area; a display panel on the first surface of the substrate, the display panel including a plurality of first lines on the first surface of the substrate, each extending in the first direction in a corresponding one of the first line areas, a plurality of second lines on the first surface of the substrate, each extending in the second direction in a corresponding one of the second line areas and crossing at least one of the first lines, and a plurality of pixels on the first surface of the substrate at a corresponding pixel area; and a touch panel on the second surface of the substrate, the touch panel including a plurality of first touch electrodes on the second surface of the substrate, each extending in the first direction in a corresponding one of the first line areas, and a plurality of second touch electrodes on the second surface of the substrate, each extending in the second direction in a corresponding one of the second line areas and crossing at least one of the first touch electrodes.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate example embodiments of the invention and together with the description serve to explain the principle of the invention. In the drawings.

DETAILED DESCRIPTION OF EXAMPLE EMBODIMENTS

Figure 1:
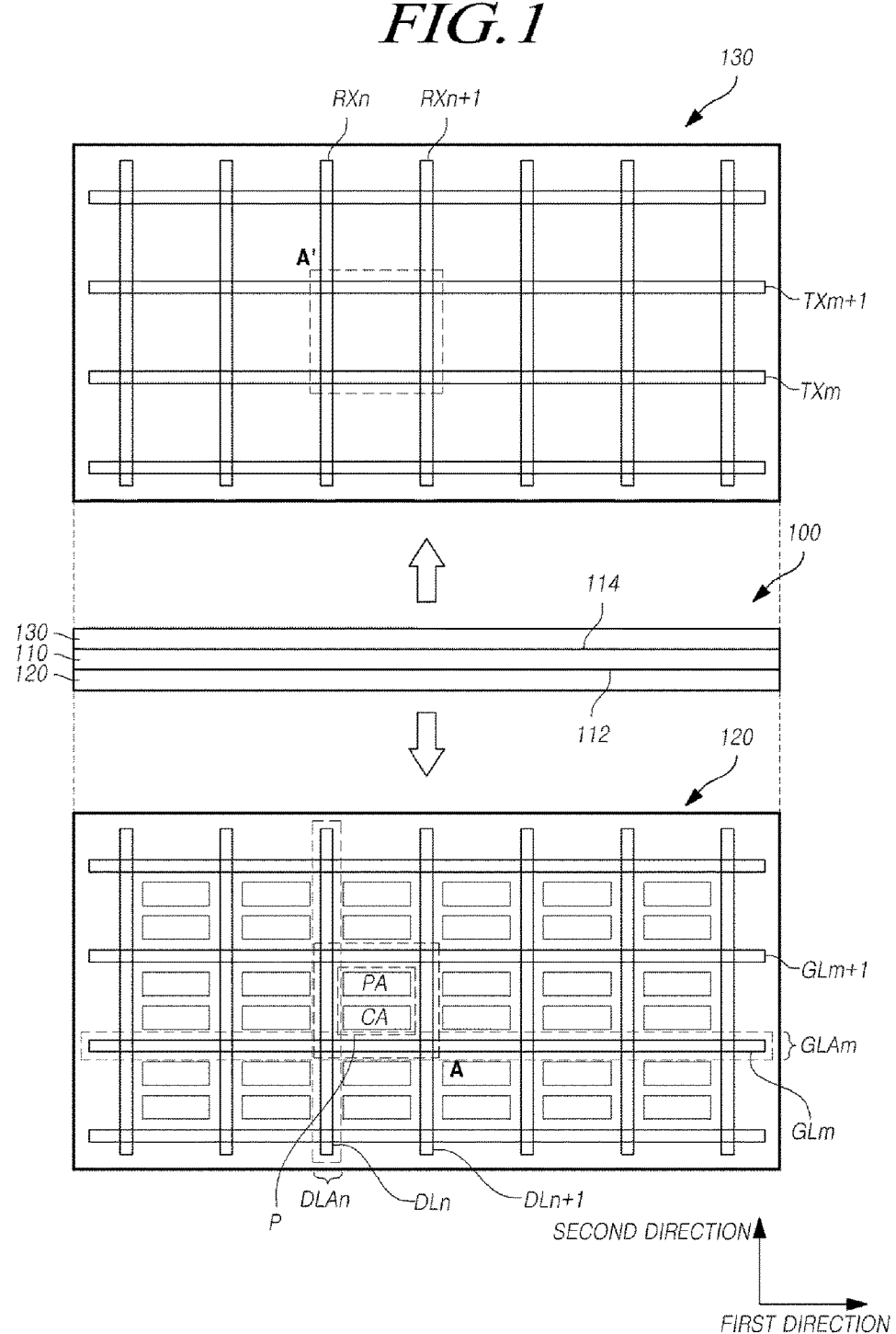
FIG. 1 is a plan view illustrating a first surface and a second surface of a display device according to an example embodiment.

Reference will now be made in detail to embodiments of the present invention, examples of which are illustrated in the accompanying drawings. In describing the invention with reference to the accompanying drawings, like elements are referenced by like reference numerals or signs regardless of the drawing numbers. Detailed descriptions of known functions and components incorporated herein may be omitted.

Also, while such terms as "first," "second," "A," "B," "(a)," and "(b)" may be used herein to describe various elements, these terms are only used to distinguish one element from another element. Unless otherwise specified, they are not intended to denote a specific sequence, order or number of elements, and the substance, sequence, order or number of these elements is not limited by these terms. When an element is referred to as being "connected to" or "coupled to" another element, it encompasses not only being "directly connected" or "coupled to" the other element, but also being "indirectly connected or coupled to" the other element via an "intervening" element unless otherwise specified. In the same context, when an element is referred to as being formed "on" or "under" another element, it encompasses not only being directly formed on or under another element, but also being indirectly formed on or under another element via an intervening element unless otherwise specified.

FIG. 1 is a plan view illustrating a first surface and a second surface of a display device according to an example embodiment. As shown in FIG. 1, a display device 100 according to the example embodiment has a touch input function, and includes a display panel 120 disposed on a first surface 112 of a substrate 110 and a touch panel 130 disposed on a second surface 114 of the substrate 110. For example, the display panel 120 is any one of a liquid crystal display panel, a plasma display panel, an organic light emitting display panel, and other display panels used for displaying an image.

In this specification, the substrate 110 is described as a joint substrate including the display panel 120 and the touch panel 130, but the substrate 110 may include or combine two or more substrates. Such combination substrate may be obtained by combining a substrate of the display panel 120 and a substrate of the touch panel 130 using an adhesive and the like.

The display device 100 includes a first line area $GLA_m$ positioned in a first direction and a second line area $DLA_n$ positioned in a second direction in the substrate 110. Further, the display panel 120 includes two or more pixels P disposed in cross areas in which two or more first line areas GLA and two or more second line area DLA cross each other. More specifically, the display panel 120 includes two or more pixels P disposed in cross areas in which, for example, a first line $GL_m$ positioned in the m-th first line area $GLA_m$ in the first direction and a second line $DL_n$ positioned in the n-th second line area $DLA_n$ in the second direction cross each other. In this example, m and n are each a natural number greater than or equal to one. The first line areas GLA mean non-emissive areas between two pixels adjacent to each other in the second direction, and the second line areas DLA mean non-emissive areas between two pixels adjacent to each other in the first direction.

As described above, the first line $GL_m$ is positioned in the first line area $GLA_m$. Further, the first line $GL_m$ may be positioned only in a portion of the first line area $GLA_m$ and not in another portion of the first line area $GLA_m$ of the display panel 120. The first line $GL_m$ may include a gate line which is positioned in the first line area $GLA_m$ on the first surface 112 of the substrate 110 in the first direction, or may alternatively include two or more gate lines, a gate line and another signal line, or diverse purpose signal lines.

As described above, the second line $DL_n$ is positioned in the second line area $DLA_n$. Further, the second line $DL_n$ may be positioned only in a portion of the second line area $DLA_n$ and not in another portion of the second line area $DLA_n$ of the display panel 120. The second line $DL_n$ includes at least one of a data line SL, a power line PL, and a reference line RL which are positioned in the second line area DLA on the first surface 112 of the substrate 110 in the second direction.

Each pixel may have different elements depending on the type of display device in which the pixel is incorporated, such as a liquid crystal display device, a plasma display device, an organic light emitting device, and the like. Each pixel is positioned in each corresponding pixel area P including a light emitting area PA and a circuit area CA. A light emitting or transmitting element of each pixel is disposed in the light emitting area PA, and a circuit element of each pixel is disposed in the circuit area CA. For example, a transistor, a capacitor, and other circuit elements may be disposed in each pixel P. Further, when the display panel 120 is an organic light emitting display panel, circuit elements including a light emitting device such as an organic light emitting diode, two or more transistors, and one or more capacitors may be disposed in each pixel.

The touch panel 130 includes a first touch electrode $TX_m$ positioned in the first line area $GLA_m$ on the second surface 114 of the substrate 110 in the first direction and a second touch electrode $RX_n$ positioned in the second line area $DLA_n$ on the second surface 114 of the substrate 110 in the second direction. A first touch electrode TX is one of a touch driving electrode and a touch sensing electrode, and a second touch electrode RX is the other of the touch driving electrode and the touch sensing electrode. For ease of reference, the description below is based on the example in which a first touch electrode TX is a touch driving electrode and a second touch electrode RX is a touch sensing electrode. However, the respective functions of a first and a second touch electrodes TX and RX may be reversed.

If there are two or more first touch electrodes TX, or two or more second touch electrodes RX, each sensor node is defined by a cross area where the first touch electrodes TX and the second touch electrodes RX cross each other. If there are two or more first touch electrodes TX, a touch driving pulse is sequentially supplied to the two or more first touch electrodes TX by a touch integrated circuit (not shown). Further, if there are two or more second touch electrodes RX, touch sensing information is sensed in the two or more second touch electrodes RX in the corresponding sensor nodes by the touch integrated circuit.

The touch panel 130 according to the example embodiment may employ a capacitance touch system in which touch information, such as the presence of a touch and a touch coordinate, is detected by two or more first touch electrodes TX and two or more second touch electrodes RX disposed on the second surface 114 of the substrate 110 on the basis of capacitance variation. The capacitance touch system is classified into, for example, a mutual capacitance touch system and a self capacitance touch system.

In the mutual capacitance touch system, a touch driving voltage (or a touch driving signal) is applied to a touch driving electrode, and is sensed in a touch sensing electrode. A capacitance is formed between the touch driving electrode and the touch sensing electrode. In the mutual capacitance touch system, regardless of whether a touch is present or not, touch information, such as a touch coordinate, is detected based on the variation in the capacitance (or mutual capacitance) between touch electrodes, i.e., between a touch driving electrode and a touch sensing electrode, caused by a pointer such as a finger and a pen.

In the self capacitance touch system, a capacitance (in this case, a self capacitance) is formed between each touch electrode and a pointer, such as a finger and a pen. This capacitance between each touch electrode and the pointer caused by the pointer is measured. Thus, regardless of whether a touch is present or not, touch information, such as a touch coordinate, is detected on the basis of the measured capacitance, in this case the self capacitance.

Contrary to the mutual capacitance touch system, in the self capacitance touch system, a touch driving voltage (touch driving signal) is applied to each touch electrode is also sensed in the same touch electrode. Accordingly, there is no distinction between a touch driving electrode and a touch sensing electrode in the self capacitance touch system.

The display device 100 according to the example embodiment may employ any one of the above mentioned two capacitance touch systems—the mutual capacitance touch system and the self capacitance touch system. However, for the convenience of description, the display device 100 according to an example embodiment employing the mutual capacitance touch system is described below in the specification. In the below description, the pixel $P_{mn}$ which is defined by the m-th first line area $GLA_m$ and the (m+1)-th first line area $GLA_{m+1}$ in the first direction, and the n-th second line area $DLA_n$ and the (n+1)-th second line area $DLA_{n+1}$ in the second direction is described as an example.

Figure 2:
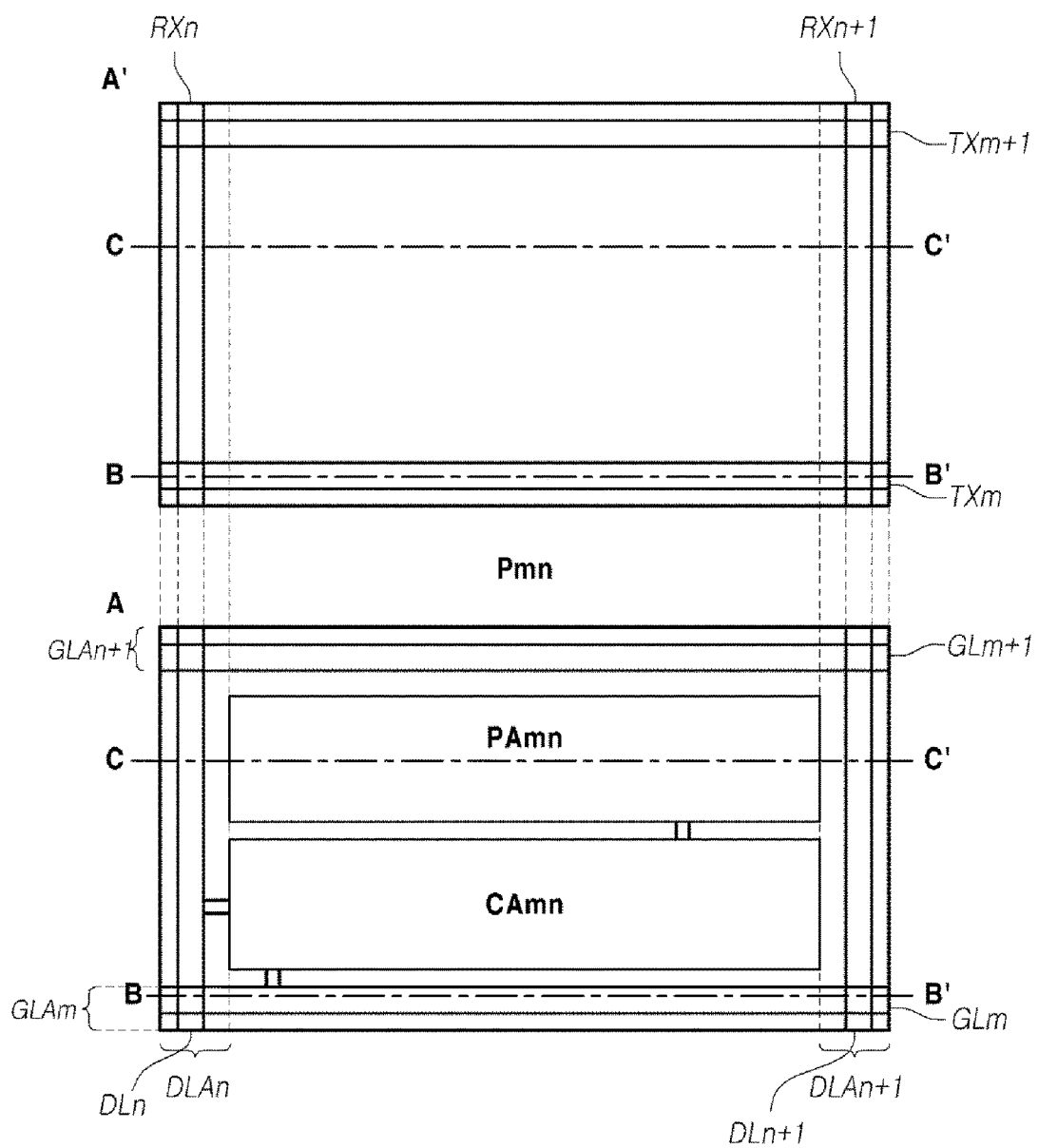
FIG. 2 is an expanded plan view illustrating portion A of an example display panel and portion A' of an example touch panel in the example display device illustrated in FIG. 1.

FIG. 2 is an expanded plan view illustrating, as an example, the portion A of a display panel and the portion A' of a touch panel in FIG. 1. The portions A and A' overlap with each other. As shown in FIG. 2, the display panel 120 includes a first line area $GLA_m$ positioned on the first surface 112 of the substrate 110 in the first direction and a second line area DLA positioned on the first surface 112 of the substrate 110 in the second direction. Further, the display panel 120 includes two or more pixels P disposed in cross areas in which two or more first line areas GLA and two or more second line areas DLA cross each other. More specifically, the display panel 120 includes a pixel $P_{mn}$ disposed in a cross area in which a first line $GL_m$ positioned in the first line area $GLA_m$ in the first direction and a second line DLn positioned in the second line area $DLA_n$ in the second direction crossed each other on the first surface 112 of the substrate 110.

The touch panel 130 includes a first touch electrode $TX_m$ positioned in the first line area $GLA_m$ on the second surface 114 of the substrate 110 in the first direction and a second touch electrode $RX_n$ positioned in the second line area $DLA_n$ on the second surface 114 of the substrate 110 in the second direction. The first touch electrode $TX_m$ may be one of a touch driving electrode and a touch sensing electrode, and the second touch electrode $RX_n$ may be the other of the touch driving electrode and the touch sensing electrode. In the below description, an example embodiment with the first touch electrode $TX_m$ as a touch driving electrode and the second touch electrode $RX_n$ as a touch sensing electrode is described. However, the present invention encompasses an example in which the respective functions of the first and second touch electrodes $TX_m$ and $RX_n$ are reversed. A sensor node is defined by a cross area in which a first touch electrode $TX_m$ and a second touch electrode $RX_n$ cross each other.

A touch driving pulse is sequentially supplied to the first touch electrode $TX_m$ by a touch integrated circuit (not shown). Further, touch sensing information is sensed in the second touch electrode $RX_n$ at a sensor node by the touch integrated circuit.

Here, the first touch electrode $TX_m$ and the second touch electrode $RX_n$ may be formed from separate layers or formed from the same layer. In other words, the touch panel 130 may have a double layer electrode structure or a single layer electrode structure. An example embodiment of the display device 110 having the double layer electrode structure is described with reference to FIGS. 3 and 4, and an example embodiment of the display device 110 having the single layer electrode structure is described with reference to FIGS. 9 and 10.

Figure 3:
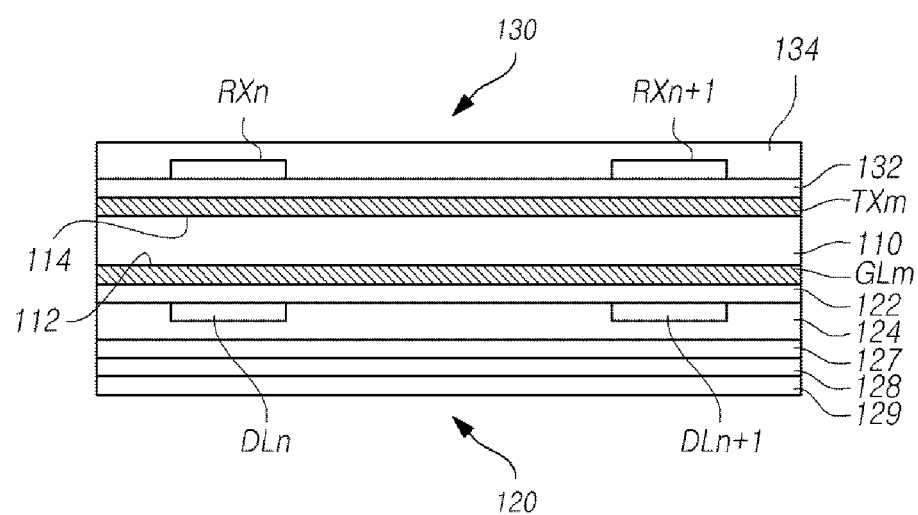
FIG. 3 is a cross sectional view taken along the line B-B' in FIG. 2.
Figure 4:
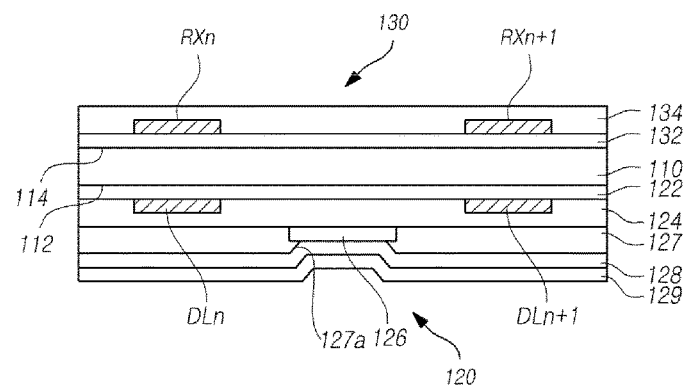
FIG. 4 is a cross sectional view taken along the line C-C' in FIG. 2.

FIG. 3 is a cross sectional view taken along the line B-B' of FIG. 2, and FIG. 4 is a cross sectional view taken along the line C-C' of FIG. 2. As shown in FIGS. 3 and 4, the display panel 120 includes a first line $GL_m$ disposed on the first surface 112 of the substrate 110, a first insulating layer 122 disposed on the first line $GL_m$, second lines $DL_n$ and $DL_{n+1}$ disposed on the first insulating layer 122, a second insulating layer 124 disposed on the second lines $DL_n$ and $DL_{n+i}$, a first electrode 126 patterned in each pixel, a bank 127 including an opening 127a exposing a portion of the first electrode 126, a dielectric layer 128 disposed on the bank 127, and a second electrode 129 disposed on the dielectric layer 128.

In FIGS. 3 and 4, one of two second lines $DL_n$ and $DL_{n+1}$ is a second line $DL_n$ positioned in the n-th second line area $DLA_n$, and the other is a second line $DL_{n+1}$ positioned in the (n+1)-th second line area $DLA_{n+1}$. The dielectric layer 128 is illustrated to be disposed on the entire first surface 112 of the substrate 110 in FIG. 4, but the dielectric layer 128 may be disposed on only the first electrode 126 through the opening 127a. If the dielectric layer 128 includes multiple layers, such as a hole injection layer, a hole transfer layer, a light emitting layer, an electron transfer layer, and an electron injection layer, a portion of the layers may be disposed on the entire first surface 112 of the substrate 110 and another portion may be disposed on only the first electrode 126 through the opening 127a.

The touch panel 130, as illustrated in FIGS. 3 and 4, includes a first touch electrode $TX_m$ disposed on the second surface 114 of the substrate 110, a dielectric layer 132 disposed on the first touch electrode $TX_m$, and second touch electrodes $RX_n$ and $RX_{n+1}$ disposed on the dielectric layer 132. One of two touch electrodes $RX_n$ and $RX_{n+1}$ illustrated in FIGS. 3 and 4 is a touch electrode $RX_n$ disposed in the n-th second line area $DLA_n$, and the other is a touch electrode $RX_{n+1}$ disposed in the (n+1)-th second line area $DLA_{n+1}$.

The touch panel 130 may or may not include a functional film 134 on the second touch electrode $RX_n$. In an example employing the functional film 134, the touch panel 130 includes the dielectric layer 132 disposed between the first touch electrode $TX_m$ and the second touch electrodes $RX_n$ and $RX_{n+1}$ on the second surface 114 of the substrate 110, and the functional film 134 disposed on the second touch electrodes $RX_n$ and $RX_{n+1}$. The functional film 134 is a film through which light penetrates. For example, the functional film 134 may be an anti-reflective film which can serve as a reflection preventing film or a reflection minimizing film.

In the example embodiment illustrated in FIGS. 3 and 4, the second touch electrode $RX_n$ is disposed on the first touch electrode $TX_m$, but the present invention is not limited to this particular example. In other words, the first touch electrode $TX_m$ may be disposed on the second touch electrode $RX_n$. The dielectric layer 132 may be disposed on the second touch electrode $RX_n$, and the first touch electrode $TX_m$ may be disposed on the dielectric layer 132. Moreover, as described below with reference to FIGS. 9 and 10, the first touch electrode $TX_m$, and the second touch electrode $RX_n$ may be formed from the same layer of the same material, and be disposed at the same layer level directly on the same underlying layer (e.g., the substrate 110 or another layer on the second surface 114 of the substrate 100). In such an example arrangement, and the dielectric layer 132 may be disposed at only a cross area where the first electrodes TX and the second electrodes RX cross each other.

The dielectric layer 132 may be formed by using the same material as that of any dielectric layer in the display panel 120, such as the first insulating layer 122, the second insulating layer 124, or the bank 127, but may also be formed of another dielectric material. For example, the dielectric layer 132 may include an organic compound or an inorganic compound. The dielectric layer 132 may be formed of a single layer or multiple layers. Where the dielectric layer 132 with multiple layers is employed, the material for each layer in the dielectric layer may be selected from any organic compound, any inorganic compound, and any commination of organic and inorganic compounds.

Each first touch electrode (e.g., $TX_m$) is positioned to correspond in position to the corresponding first line (e.g., $GL_m$) with the substrate 110 interposed therebetween in a cross sectional view. Also, each second touch electrode (e.g., $RX_n$) is positioned to correspond in position to the corresponding second line (e.g., $DL_n$) with the substrate 110 interposed therebetween in a cross sectional view.

The material for the first touch electrode TX may be the same as that for the first line GL, and the material for the second touch electrode RX may be the same as that for the second line DL. However, different materials may be used instead. For example, if the material for the first line GL is a low reflection metal, a metal oxide, or any combination of the two, then the material for the first touch electrode TX may also a low reflection metal, a metal-oxide, or a combination of the two. Also, if the material for the second line DL is a low reflection metal, a metal-oxide, or any combination of the two, then the material for the second touch electrode RX may also be a low reflection metal, a metal-oxide, or a combination of the two.

Moreover, the same materials may be used for the first and second touch electrodes TX and RX as for the first and second lines GL and DL, respectively. In other words, the material for the first touch electrode TX may be the same as that for the first line GL, and the material for the second touch electrode RX may be the same as that for the second line DL. For example, if the first line GL and the second line DL each include multiple layers of a low reflection metal and a metal-oxide, such as layers of Cu/ITO/Mo, the first touch electrode TX and the second touch electrode RX may also include multiple layers of the same low reflection metal and metal-oxide, such as the layers of Cu/ITO/Mo.

If a low reflection material is for the first touch electrode TX and the second touch electrode RX, the reflectivity of the touch panel 130, and therefore the display device, can be reduced. Furthermore, if the touch panel 130 incorporates the functional film 134 on the first touch electrode TX and the second touch electrode RX as a reflection preventing or mitigating film, the reflectivity can be further reduced.

The width of the first touch electrode $TX_m$ may be equal to or narrower than that of the corresponding first line area $GLA_m$. In other words, the first touch electrode $TX_m$ may be positioned entirely within the first line area $GLA_m$. Also, the width of the second touch electrode $RX_n$ may be equal to or narrower than the corresponding second line area $DLA_n$. In other words, the second touch electrode $RX_n$ may be positioned entirely within the second line area $DLA_n$.

In the example embodiment illustrated in FIG. 2, the first lines $GL_m$ and $GL_{m+1}$ and the first touch electrodes $TX_m$ and $TX_{m+1}$ have the same width, and the second line $DL_n$ and the second touch electrode $RX_n$ have the same width. However, the present invention is not limited to having such an arrangement. In other words, the first touch electrode $TX_m$ may be wider than the first line $GL_m$, or vice verse. Also, the second touch electrode $RX_n$ may be wider than the second line $DL_n$, or vice verse.

If the first line $GL_m$ and the first touch electrode $TX_m$ have the same width, both may be formed by using the same process or the same mask. Also, if the second line $DL_m$ and the second touch electrode $RX_n$ have the same width, both may be formed by using the same process or the same mask.

FIGS. 5A to 5E are expanded plan views illustrating various examples of the portion A' of the touch panel 130 in FIG. 1, in conjunction with the portion A of the display panel 120.

Figure 5A:
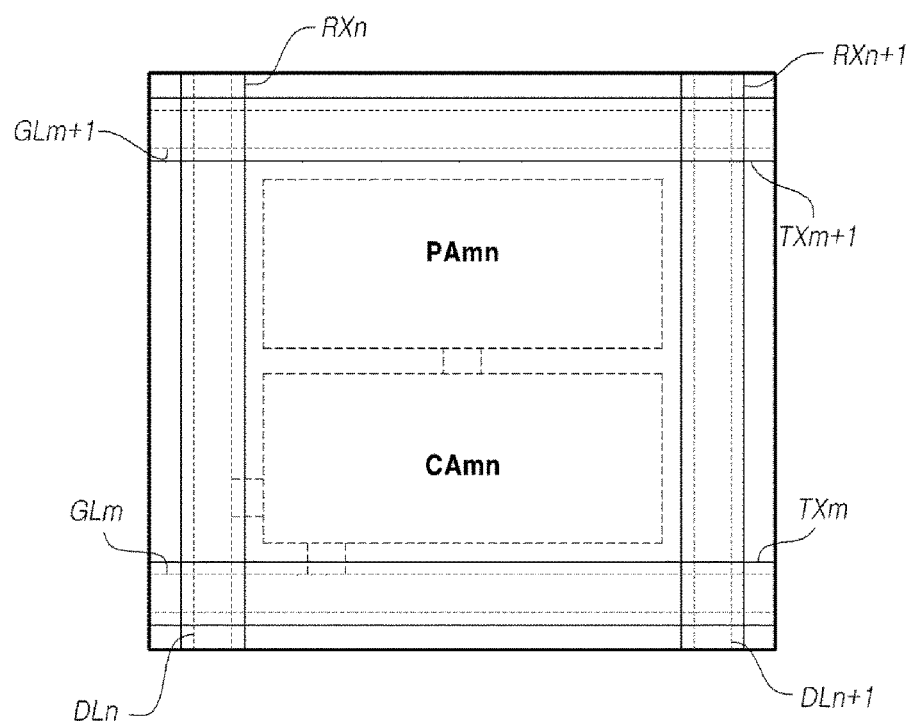
FIGS. 5A to 5E are expanded plan views illustrating the portion A and portion A' of examples of the display panel and the touch panel illustrated in FIG. 1.

In the example illustrated in FIG. 5A, the first touch electrode $TX_m$ is wider than the first line $GL_m$, and the second touch electrode $RX_n$ is wider than the second line $DL_m$. Alternatively, the first touch electrode $TX_m$ may be wider than the first line $GL_m$, but the width of the second touch electrode $RX_n$ may be equal to that of the second line $DL_n$. As another alternative, the width of the first touch electrode $TX_m$ may be equal to that of the first line $GL_m$, but the second touch electrode $RX_n$ may be wider than the second line $DL_n$. Since the first touch electrode $TX_m$ and the second touch electrode $RX_n$ may serve to prevent or mitigate light leakage and color mixture between pixels, the first touch electrode $TX_m$ and the second touch electrode $RX_n$ each having a substantially greater width may improve the function of preventing light leakage and color mixture.

Figure 5B:
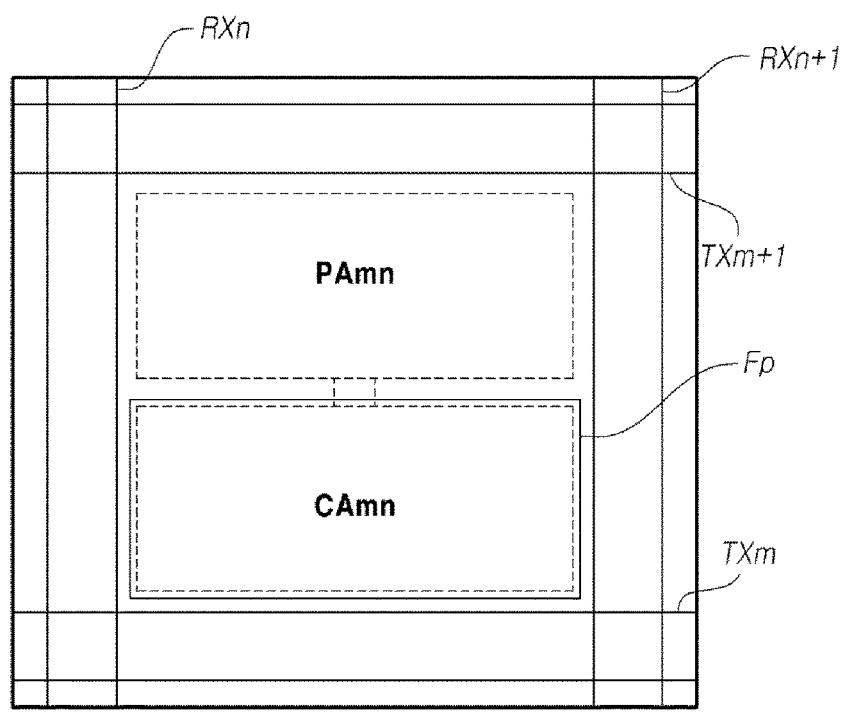

As illustrated in FIG. 5B, if the pixel P is positioned in a pixel area $P_{mn}$ including the light emitting area $PA_{mn}$ and the circuit area $CA_{mn}$, the touch panel 130 may further include a light shielding pattern Fp positioned in and around the circuit area $CA_{mn}$ on the second surface 114 of the substrate 110. The light shielding pattern Fp serves to prevent or limit external light from being introduced into the covered area of the display panel 120. Thus, the circuit elements of the display panel 120 in the circuit area $CA_{mn}$ are protected from the external light.

Figure 5C:
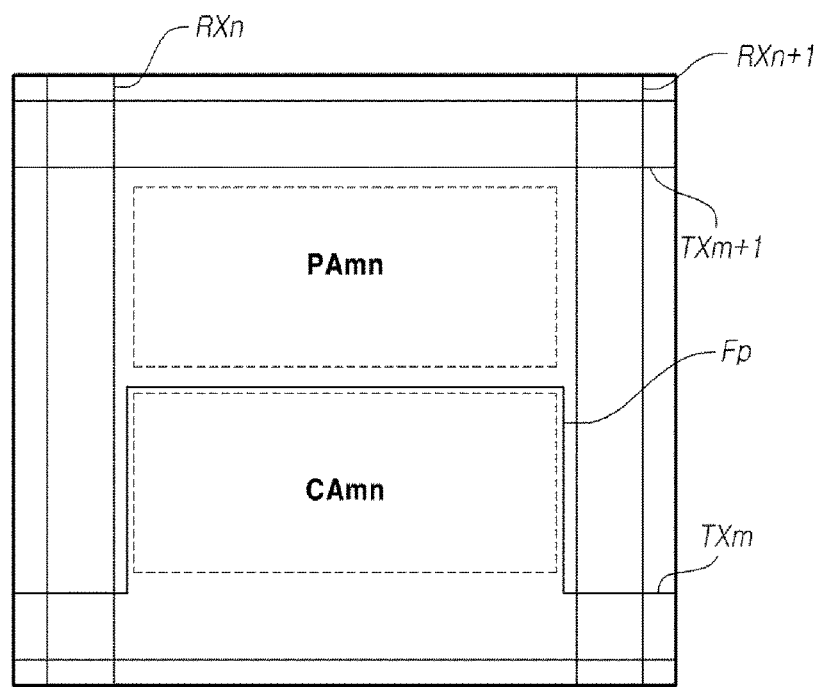
Figure 5D:
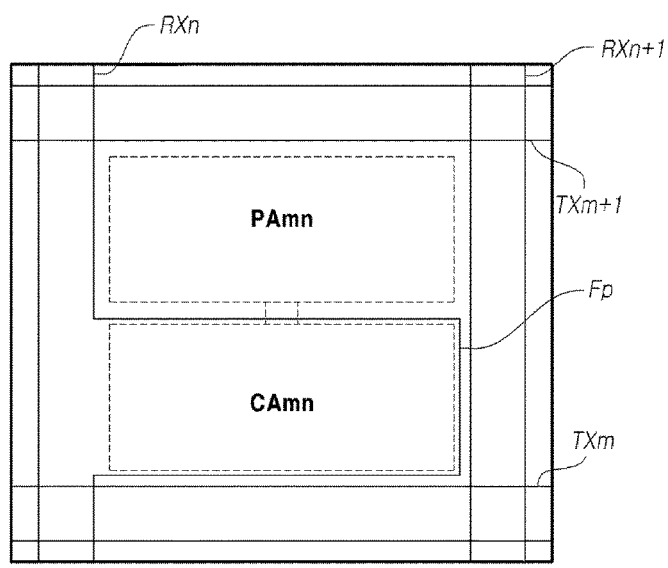

The light shielding pattern Fp is separated from the first touch electrode $TX_m$ and the second touch electrode $RX_n$ in the example illustrated in FIG. 5B, but may alternatively be connected to and integral with any one of the first touch electrode $TX_m$ and the second touch electrode $RX_n$ as illustrated in FIGS. 5C and 5D, respectively. As illustrated in FIG. 5B, if the light shielding pattern Fp is separated from the first touch electrode $TX_m$ and the second touch electrode $RX_n$, the light shielding pattern may or may not be positioned at the same layer level and include the same material as any one of the first touch electrode $TX_m$ and the second touch electrode $RX_n$.

In the example illustrated in FIG. 5C, the light shielding pattern Fp is connected to and is integral with the first touch electrode $TX_m$. Here, the light shielding pattern Fp is formed from the same layer and with the same material as the first touch electrode $TX_m$. In other words, as illustrated in FIGS. 3 and 4 for example, if the first touch electrode $TX_m$ is positioned on the second surface 114 of the substrate 110 and the second touch electrode $RX_n$ is positioned on the first touch electrode $TX_m$, the light shielding pattern Fp is positioned at the same layer level as and formed with the same material as the first touch electrode $TX_m$. For example, the light shielding pattern Fp is positioned to correspond positionally to a specific element in the display panel 120 that serves as a light shield. Here, the light shielding pattern Fp may include the same material as such a light shield element in the display panel 120.

In the example illustrated in FIG. 5D, the light shielding pattern Fp is connected to and is integral with the second touch electrode $RX_n$. Here, the light shielding pattern Fp is formed from the same layer as and with the same material as the second touch electrode $RX_n$. In other words, as illustrated in FIGS. 3 and 4 for example, if the first touch electrode $TX_m$ is positioned on the second surface 114 of the substrate 110 and the second touch electrode $RX_n$ is positioned on the first touch electrode $TX_m$, the light shielding pattern is also positioned at the same layer level as and formed with the same material as the second touch electrode $RX_n$.

Figure 5E:
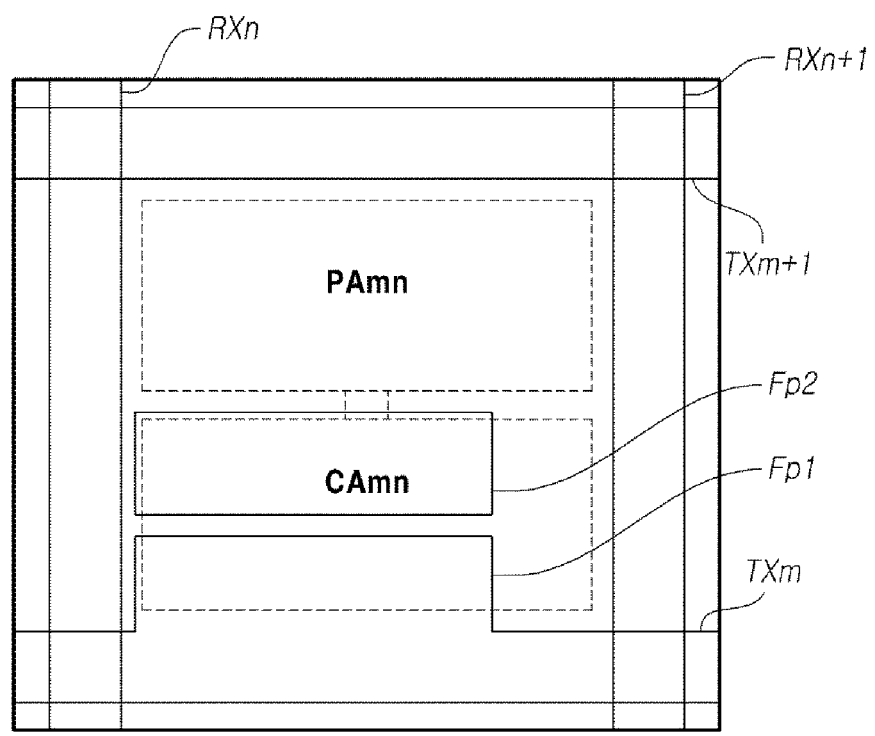

As illustrated in FIG. 5E, the touch panel 130 may include a first and a second light shielding patterns Fp1 and Fp2 positioned in the circuit area CAn on the second surface 114 of the substrate 110. Here, the first light shielding pattern Fp1 may be connected to and integral with any one of the first touch electrode $TX_m$ and the second touch electrode $RX_n$, and the second light shielding pattern Fp2 may be separated from the first touch electrode $TX_m$ and the second touch electrode $RX_n$.

Alternatively, the first and the second light shielding patterns Fp1 and Fp2 both may be separated from the first touch electrode $TX_m$ and the second touch electrode $RX_n$, or both of the first and the second light shielding patterns Fp1 and Fp2 may be connected to and integral with any one of the first touch electrode $TX_m$ and the second touch electrode $RX_n$. For example, the first light shielding pattern Fp1 may be connected to and integral with the first touch electrode $TX_m$ as illustrated in FIG. 5E, and the second light shielding pattern Fp2 may be connected to and integral with the second touch electrode $RX_n$ as illustrated in FIG. 5D.

The first and the second light shielding patterns Fp1 and Fp2 may be formed with the same materials or with different materials from each other.

The first touch electrode $TX_m$ and the second touch electrode $RX_n$ of the touch panel 130 are disposed in the first line area $GLA_m$ and the second line area $DLA_n$ of the display panel 120, respectively. This may allow the display device 100 to prevent or mitigate the light leakage and color mixture between pixels, as well as providing a touch function. Further, since the touch electrodes used to perform the touch function are disposed in the non-emissive area, the touch panel 130 causes little to no reduction in the aperture ratio and the transmittance ratio. Namely, if the display panel 120 is disposed on the first surface 112 of the substrate 110 and the touch panel 130 on the second surface 114 of the substrate 110 in such a way that each touch electrode of the touch panel 130 is disposed in a position corresponding to the non-emissive area of the display panel 120 in the shape of a grid or a matrix, high luminance can be achieved with little to no decrease in the transmittance ratio in comparison with other touch panels with different structures.

In the above described example embodiments, each of the first line $GL_m$ and the second line $DL_n$ includes a single line. However, one or each of the first line $GL_m$ and the second line $DL_n$ may include two or more lines. In this regard, FIGS. 6A to 6C are expanded plan views illustrating more examples of the A' portion of the touch panel in FIG. 1.

Figure 6A:
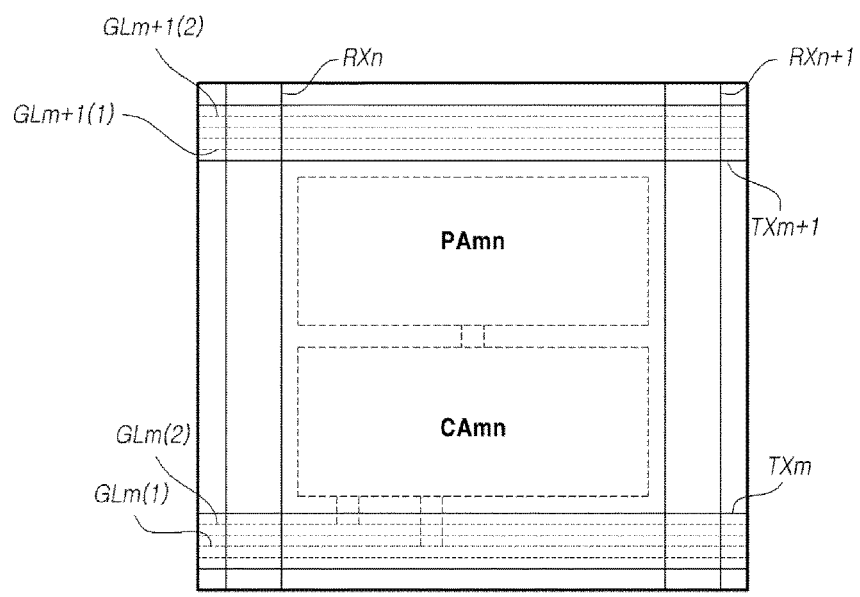
FIGS. 6A to 6C are expanded plan views illustrating the portion A' of additional examples of the touch panel in FIG. 1.

As illustrated in FIG. 6A, the first line $GL_m$ may include two or more lines, e.g., $GL_m(1)$ and $GL_m(2)$, and the width of the first touch electrode $TX_m$ may be equal to or greater than the combined width of lines $GL_m(1)$ and $GL_m(2)$ included in the first line $GL_m$. In this example, the second line $DL_n$ includes a single line.

In the example illustrated in FIG. 6A, the combined width of lines $GL_m(1)$ and $GL_m(2)$ included in the first line $GL_m$ may refer to the sum of the widths of the two lines $GL_m(1)$ and $GL_m(2)$, or to the sum of the widths of the two lines $GL_m(1)$ and $GL_m(2)$ plus the width of the gap between the two lines $GL_m(1)$ and $GL_m(2)$. For example, if each pixel P is electrically connected to two gate lines, the two gate lines constitute one first line $GL_m$. Here, the width of the first touch electrode $TX_m$ is equal to or greater than the combined width of the two gate lines in the first line $GL_m$.

Figure 6B:
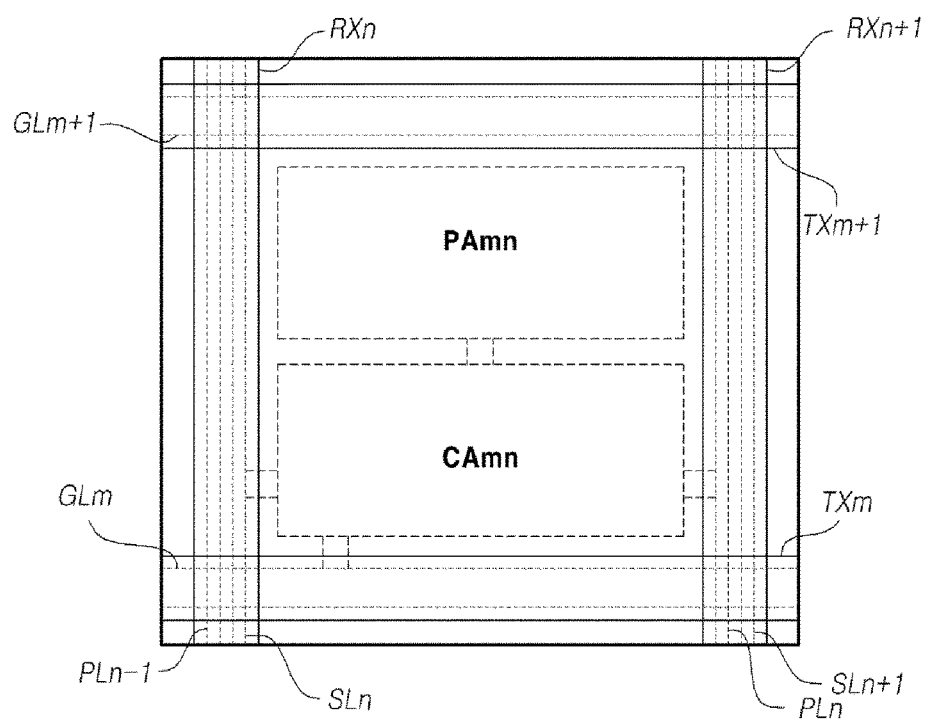
Figure 6C:
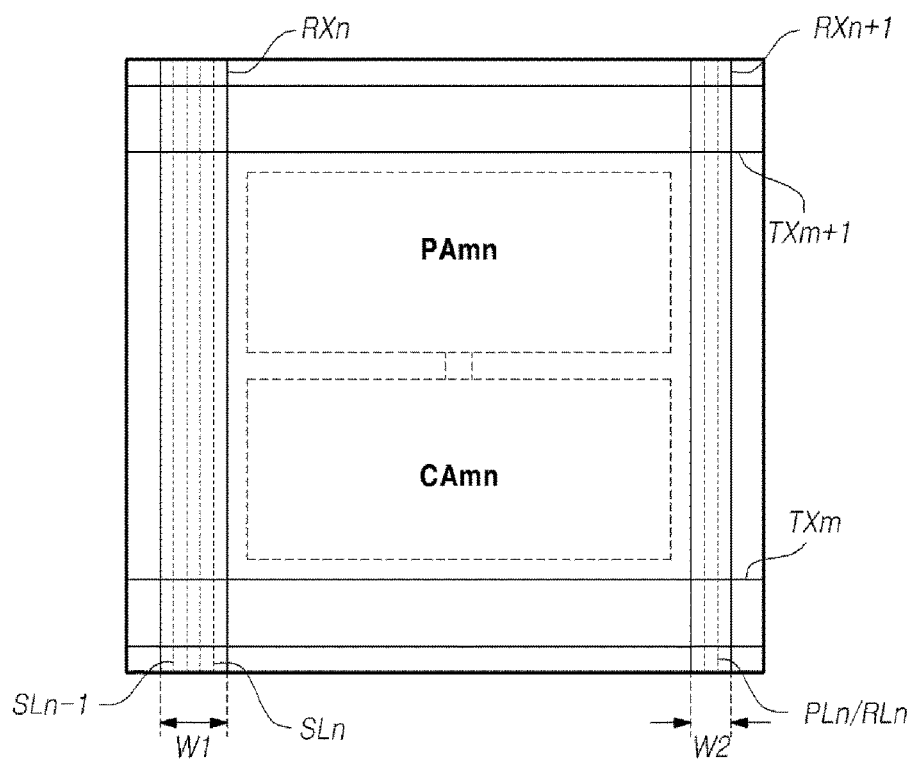

As illustrated in FIG. 6B, the second line $DL_n$ may include two or more lines, e.g., $PL_{n-1}$ and $SL_n$, and the width of the second touch electrode $RX_n$ may be equal to or greater than the combined width of the lines $PL_{n-1}$ and $SL_n$ included in the second line $DL_n$. Here, the combined width of the lines $PL_{n-1}$ and $SL_n$, included in the second line $DL_n$ may refer to the sum of the widths of the two lines $PL_{n-1}$ and $SL_n$, or to the sum of the widths of the two lines $PL_{n-1}$ and $SL_n$ plus the width of the gap between the two lines $PL_{n-1}$ and $SL_n$.

For example, if a pixel $P_{mn}$ (e.g., the pixel at the m-th row and n-th column or the pixel connected to the m-th first line $GL_m$ and the n-th second line $DL_n$) is connected to a data line or source line $SL_n$ and a power line $PL_n$, a power line $PL_{n-1}$ of an adjacent pixel $P_{m(n-1)}$ and the data line $SL_n$ of the pixel $P_{mn}$ constitute a second line $DL_n$. Also, a power line $PL_n$ of the pixel $P_{mn}$ and the data line $SL_{n+1}$ of another adjacent pixel $P_{m(n+1)}$ constitute a first line $DL_{n+1}$. Here, a width of the second touch electrode $RX_n$ is greater than or equal to the combined width of the power line $PL_{n-1}$ of the adjacent pixel $P_{m(n-1)}$ and the data line SL of the pixel $P_{mn}$.

Examples in which only one of the first line $GL_m$ and the second line $DL_n$ includes two or more lines are illustrated in FIGS. 6A and 6B, respectively. However, the first line $GL_m$ and the second line $DL_n$ may each include two or more lines. Moreover, in the above examples, each of the first lines GL is described to have the same configuration, and each of the second lines DL is described to have the same configuration. However, the first lines GL (e.g., $GL_m$ and $GL_{m+1}$) may have different configurations from one another, and the second lines DL (e.g., $DL_n$ and $DL_{n+1}$) may have different configurations from one another. For example, the n-th second line $DL_n$ may include two data lines $SL_{n-1}$ and $SL_n$, and the (n+1)-th second line $DL_{n+1}$ may include only one of lines $PL_n$ and $RL_n$ as illustrated in FIG. 6C.

In the example illustrated in FIG. 6C, the width of the n-th second touch electrode $RX_n$ is equal to or greater than the combined width of the two lines $SL_{n-1}$ and $SL_n$ that make up the n-th second line $DL_n$, and the width of the (n+1)-th second touch electrode $RX_{n+1}$ is equal to or greater than that of the (n+1)-th second line $DL_{n+1}$, which is either of the lines $PL_n$ and $RL_n$. In this case, the width of the n-th second line area $DLA_n$ may be greater than that of the (n+1)-th second line area $DLA_{n+1}$, and the width of the n-th second touch electrode $RX_n$ greater than that of the (n+1)-th second touch electrode $RX_{n+1}$. As a result, the wider second touch electrodes RX and the narrower second touch electrodes RX may be positioned in an alternating fashion.

For example, the n-th second line $DL_n$ may include data lines $SL_{n-1}$ and $SL_n$ of two adjacent pixels, and the (n+1)-th second line $DL_{n+1}$ may be either the power line $PL_n$ for the pixels in the n-th column, e.g., $P_{mn}$ and $P_{(m+1)n}$, or a reference line $RL_n$ used to sense a characteristic value, such as a threshold voltage or mobility of a transistor included in a pixel in the n-th column, e.g., $P_{mn}$ and $P_{(m+1)n}$. As illustrated in FIG. 6C, the n-th second line $DL_n$ positioned in the n-th second line area $DLA_n$ includes two or more lines (e.g., $SL_{n-1}$ and $SL_n$), and the (n+1)-th second line $DL_{n+1}$ positioned in the (n+1)-th second line area $DLA_{n+1}$ includes a single line (e.g., $PL_n$ or $RL_n$). Thus, the width W1 of the n-th second touch electrode $RX_n$ positioned the n-th second line area $DLA_n$ is greater than the width W2 of the (n+1)-th second touch electrode $RX_{n+1}$.

Figure 7:
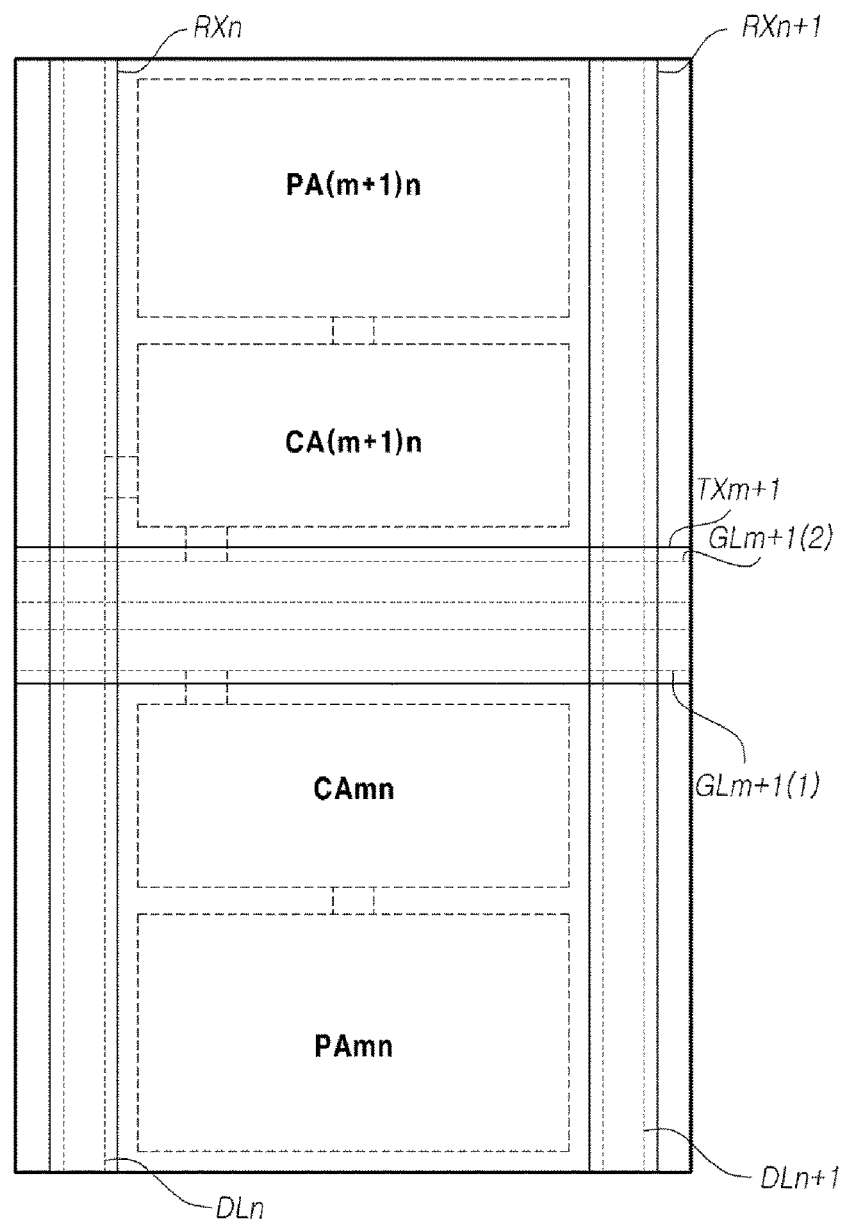
FIG. 7 is an expanded plan view illustrating two pixels of the display device illustrated in FIG. 1 according to an example embodiment.

FIG. 7 is an expanded plan view illustrating two pixels of FIG. 1. FIG. 7 illustrates an expanded view of an area of the display panel 120 and the touch panel 130 that includes portion A and A' (FIG. 1), and an adjacent portion in the top to bottom direction (e.g., the second direction). As shown in FIG. 7, each pixel is positioned in a pixel area P including a light emitting area PA and a circuit area CA. A circuit area CAn of the n-th pixel Pn is adjacent to a circuit area CAn+1 of the (n+1)-th pixel Pn+1.

Here, the (m+1)-th first line $GL_{m+1}$, which is positioned in the (m+1)-th first line area $GLA_{m+1}$ between the pixel Pmn and the pixel P(m+1)n, includes two gate lines $GL_{m+1}(1)$ and $GL_{m+1}(2)$. The width of the (m+1)-th first touch electrode $TX_{m+1}$ positioned in the (m+1)-th first line area $GLA_{m+1}$ is equal to or greater than the combined width of the two gate lines $GL_{m+1}(1)$ and $GL_{m+1}(2)$.

Figure 8:
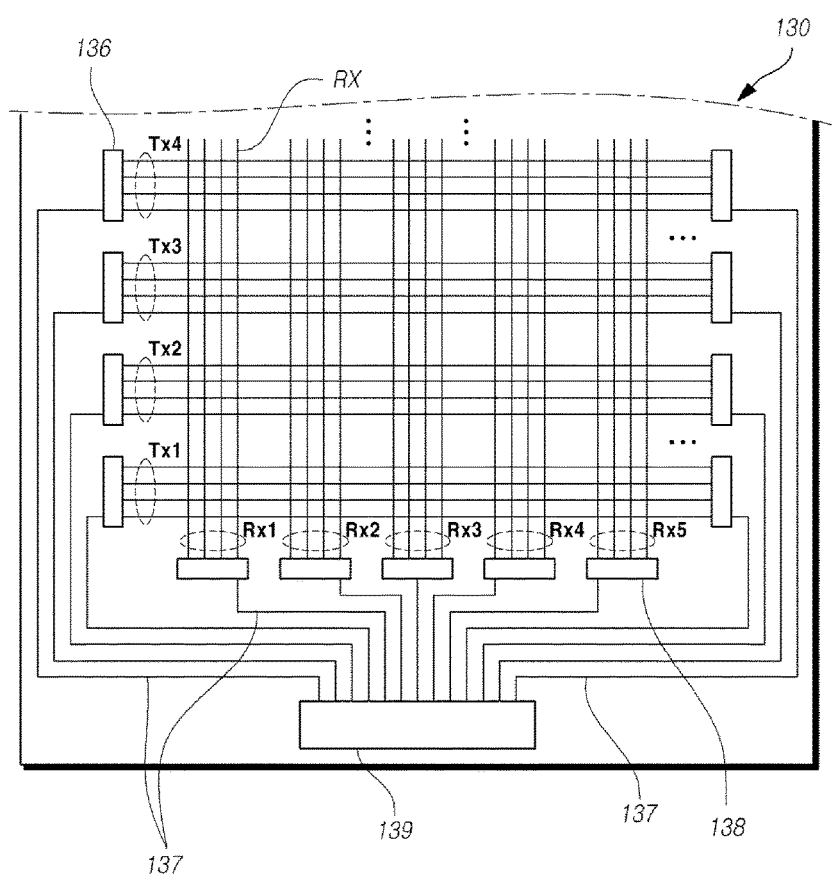
FIG. 8 is a plan view illustrating the touch panel according to another example embodiment.

FIG. 8 is a plan view illustrating the touch panel 130 according to another example embodiment. As shown in FIG. 8, a touch panel 130 according to this example embodiment is similar to the example embodiments of the touch panel 130 described with reference to FIGS. 1 to 7.

In the example embodiment of the touch panel 130 illustrated in FIG. 8, two or more first touch electrodes TX are electrically connected to one another via a first connection pattern 136 to form a first touch channel, and two or more second touch electrodes RX are electrically connected to one another via a second connection pattern 138 to form a second touch channel. For example, two or more first touch electrodes TX positioned within a predetermined length may each be electrically connected to a first connection pattern 136 to form a first touch channel (e.g., Tx1, Tx2, Tx3, Tx4, and so on), and two or more second touch electrodes RX positioned within a predetermined length may each be electrically connected to a second connection pattern 138 to form a second touch channel (e.g., Rx1, Rx2, Rx3, Rx4, and so on).

Since a sensor node is configured by an area in which a first touch channel and a second touch channel cross each other, touch sensing capability or sensitivity can be improved while the number of connection lines 137 electrically connecting the first and the second touch electrodes to a touch integrated circuit or a touch pad 139 can be reduced. Further, in this example embodiment, one touch channel may include many touch electrodes, thus significantly increasing the capacitance difference ΔCm between a touch condition and a non touch condition, thereby improving the touch sensing capability and sensitivity.

In the example embodiment illustrated in FIG. 8, the first connection patterns 136 are positioned at both sides of the first touch electrodes TX, and the connection lines 137 are connected from the first connection patterns 136 at both sides to the touch integrated circuit or the touch pad 139. However, the first connection patterns 136 may be positioned at only one side of the first touch electrodes TX, thereby further reducing the number of connection lines 137.

In the example embodiments discussed above in detail, the touch panel 130 having the double layered electrode structure is described, but the touch panel 130 may have the single layered electrode structure. In the description below, an example embodiment of a display device having the touch panel 130 having the single layered electrode structure is detailed with reference to FIGS. 9 and 10.

Figure 9:
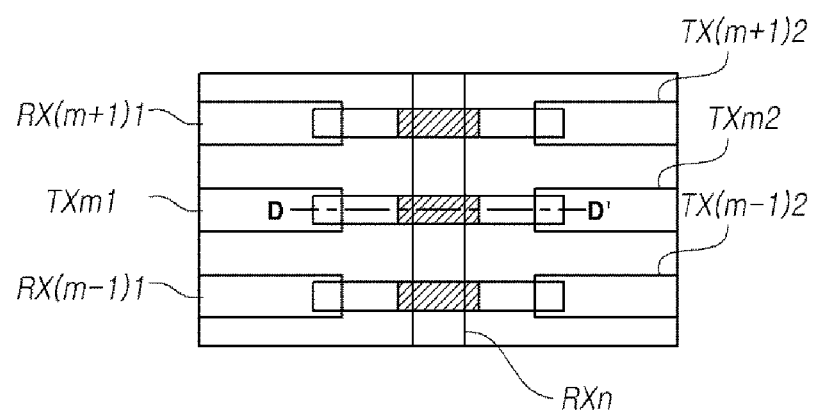
FIG. 9 is a plan view illustrating a touch panel with a first touch electrode and a second touch electrode according to still another example embodiment.
Figure 10:
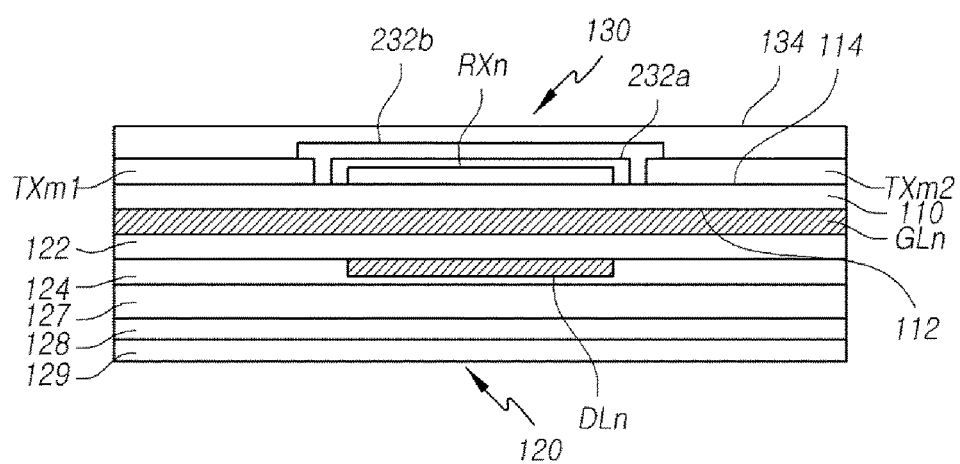
FIG. 10 is a cross sectional view taken along the line D-D' in FIG. 9.

FIG. 9 is a plan view illustrating first touch electrodes TX and second touch electrodes RX according to another example embodiment. FIG. 10 is a cross sectional view taken along the line D-D' of FIG. 9.

As shown in FIGS. 9 and 10, the touch panel 130 includes first touch electrodes TX and second touch electrodes RX that are positioned on the same plane on a second surface 114 of a substrate 110. The first touch electrodes TX and the second touch electrodes RX are separated from each other via a dielectric layer in areas in which the first touch electrodes TX and the second touch electrodes RX cross each other.

The display panel 120 includes a first line $GL_m$ disposed on a first surface 112 of the substrate 110, a first insulating layer 122 disposed on the first line $GL_m$, a second line $DL_n$ disposed on the first insulating layer 122, a second insulating layer 124 disposed on the second line $DL_n$, a first electrode (not shown) patterned in each pixel, a bank (not shown) including an opening (not shown) disposed on the first electrode to expose a part of the first electrode, a dielectric layer 128 disposed on the bank, and a second electrode 129 disposed on the dielectric layer 128. The display panel 120 according to this example embodiment is largely the same as that according to the example embodiment illustrated in and described with reference to FIGS. 3 and 4.

As shown in FIGS. 9 and 10, the m-th first touch electrode $TX_m$ includes the first and the second division patterns $TX_{m1}$ and $TX_{m2}$, and a bridge 232b which electrically connects the first division pattern $TX_{m1}$ to the second division pattern $TX_{m2}$. The n-th second touch electrode $RX_n$ is positioned between the first division pattern $TX_{m1}$ and the second division pattern $TX_{m2}$ on the same plane (e.g., directly on the same underlying layer), and a dielectric layer 232a and the bridge 232b are sequentially disposed on the n-th second touch electrode $RX_n$.

As described with reference to FIGS. 9 and 10, in the single layered electrode structure, in which a touch driving electrode (e.g., TX) and a touch sensing electrode (e.g., RX) are disposed on the same plane, the thickness of the touch panel can be reduced, and the touch sensing capability and sensitivity can be improved.

The display device according to the above example embodiments may provide for a touch function with improved aperture ratio and transmittance ratio. Also, the display device according to the above example embodiments may reduce reflectivity of internal and external lights, and prevent or reduce light leakage and color mixture between pixels. Further, the display device according to the above example embodiments may allow for high luminance while improving the display image quality.

It will be apparent to those skilled in the art that various modifications and variations can be made in the display device of the present invention without departing from the spirit or scope of the invention. Thus, it is intended that the present invention cover the modifications and variations of this invention, including the modifications and variations of the above example embodiments, provided they come within the scope of the appended claims and their equivalents.

What is claimed is:

1. A display device, comprising:
    a substrate having a first surface and a second surface opposite the first surface;
    a first line area extending in a first direction on the substrate;
    a second line area extending in a second direction different from the first direction on the substrate;
    a pixel area adjacent to the first line area and the second line area on the substrate, and having a light emitting area;
    a first line formed on the first surface of the substrate and extending in the first direction in the first line area, the first surface of the substrate being disposed between the first line and the second surface of the substrate;
    a second line formed on the first surface of the substrate, extending in the second direction in the second line area, and crossing the first line;
    a pixel on the first surface of the substrate at an intersection of the first line and the second line, the pixel being within the pixel area; and
    a first touch electrode formed on the second surface of the substrate without being disposed in the light emitting area and extending in the first direction in the first line area, the substrate being disposed between the first line and the first touch electrode;
    a second touch electrode formed on the second surface of the substrate without being disposed in the light emitting area, extending in the second direction within the second line area, and crossing the first touch electrode;
    wherein the first touch electrode includes a same material as the first line, and the second touch electrode includes a same material as the second line.

2. The display device according to claim 1, further comprising:
    a dielectric layer between the first touch electrode and the second touch electrode; and
    a functional film formed on the first touch electrode and the second touch electrode.

3. The display device according to claim 1, wherein a width of the first touch electrode is the same as or greater than a width of the first line so that the first line is substantially entirely covered by the first touch electrode in a plan view, and
    wherein a width of the second touch electrode is the same as or greater than a width of the second line so that the second line is substantially entirely covered by the second touch electrode in the plan view.

4. The display device according to claim 1, further comprising:
    a plurality of first lines, including the first line, formed on the first surface of the substrate and each extending in the first direction;
    a plurality of second lines, including the second line, formed on the first surface of the substrate, each extending in the second direction and crossing the first lines; and
    a first light shielding pattern formed on the second surface of the substrate,
    wherein the pixel area is surrounded by the first line and an adjacent one of the first lines and the second line and an adjacent one of the second lines, and further includes a circuit area; and
    wherein the first light shielding pattern is in the circuit area.

5. The display device according to claim 4, wherein the first light shielding pattern is coupled to and is integrated with one of the first touch electrode and the second touch electrode.

6. The display device according to claim 4, further comprising:
    a second light shielding pattern formed on the second surface of the substrate in the circuit area,
    wherein the first light shielding pattern is coupled to and is integral with one of the first touch electrode and the second touch electrode, and
    wherein the second light shielding pattern is separated from the first touch electrode and the second touch electrode.

7. The display device according to claim 1, wherein the first line includes a plurality of conductive lines, and
    wherein a width of the first touch electrode is equal to or greater than a combined width of the conductive lines of the first line so that the conductive lines of the first line are substantially entirely covered by the first touch electrode in a plan view.

8. The display device according to claim 1, wherein the second line includes a plurality of conductive lines, and
    wherein a width of the second touch electrode is equal to or greater than a combined width of the conductive lines of the second line so that the conductive lines of the second line are substantially entirely covered by the second touch electrode in a plan view.

9. The display device according to claim 1, wherein the first touch electrode and the second touch electrode are disposed directly on a same underlying layer, and
    wherein the first touch electrode and the second touch electrode are separated from each other by a dielectric layer where the first touch electrode and the second touch electrode cross each other.

10. The display device according to claim 9, wherein the first touch electrode includes a first division pattern, a second division pattern, and a bridge electrically connecting the first division pattern to the second division pattern,
    wherein the second touch electrode is disposed directly on the same underlying layer as at least one of the first division pattern and the second division pattern, and
    wherein the dielectric layer is on the second touch electrode, and the bridge is on the second touch electrode.

11. A display device, comprising:
    a substrate having a first surface and a second surface opposite the first surface;
    a plurality of first line areas each extending in a first direction on the substrate;
    a plurality of second line areas each extending in a second direction different from the first direction on the substrate;
    a plurality of pixel areas on the substrate, each surrounded by two of the first line areas and two of the second line areas, and each including a light emitting area and a circuit area;
    a display panel on the first surface of the substrate so that the first surface of the substrate is disposed between the display panel and the second surface of the substrate, the display panel including:

a plurality of first lines formed on the first surface of the substrate, each extending in the first direction in a corresponding one of the first line areas, a plurality of second lines formed on the first surface of the substrate, each extending in the second direction in a corresponding one of the second line areas and crossing at least one of the first lines, and a plurality of pixels on the first surface of the substrate at a corresponding pixel area; and a touch panel on the second surface of the substrate so that the second surface of the substrate is disposed between the touch panel and the first surface of the substrate, the touch panel including:

a plurality of first touch electrodes formed on the second surface of the substrate, each extending in the first direction in a corresponding one of the first line areas or in the second direction in a corresponding one of the second line areas without being disposed in the light emitting area of a corresponding one of the pixel areas;

wherein each of the first touch electrodes extends in the first direction within the corresponding one of the first line areas, and wherein the touch panel further includes a plurality of second touch electrodes formed on the second surface of the substrate, each extending in the second direction within a corresponding one of the second line areas without being disposed in the light emitting area of the corresponding one of the pixel areas and crossing at least one of the first touch electrodes to provide a sensor node at an area of crossing;

wherein the first touch electrodes includes a same material as the first lines, and the second touch electrodes includes a same material as the second lines.

12. The display device according to claim 11, wherein a width of one of the first touch electrodes is the same as or greater than a width of a corresponding one of the first lines so that the one of the first touch electrodes substantially entirely covers the corresponding first line in a plan view, and wherein a width of one of the second touch electrodes is the same as or greater than a width of a corresponding one of the second lines so that the one of the second touch electrodes substantially entirely covers the corresponding second line in the plan view.

13. The display device according to claim 11, wherein the touch panel further includes a first light shielding pattern on the second surface of the substrate in the circuit area.

14. The display device according to claim 13, wherein the touch panel further includes a second light shielding pattern on the second surface of the substrate in the circuit area, wherein the first light shielding pattern is coupled to and is integral with a corresponding one of the first touch electrodes, and wherein the second light shielding pattern is separated from the first touch electrodes.

15. The display device according to claim 11, wherein the second line areas includes an n-th second line area and a (n+1)-th second line area adjacent to the n-th second line area, where n is a natural number greater than or equal to one, wherein the second lines includes an n-th second line having a plurality of conductive lines extending in the second direction in the n-th second line area, and a (n+1)-th second line having only one conductive line extending in the second direction in the (n+1)-th second line area, and wherein the second touch electrodes includes an n-th second touch electrode in the n-th second line area and a (n+1)-th second touch electrode in the (n+1)-th second line area, where the n-th touch electrode is wider than the (n+1)-th second touch electrode.

16. The display device according to claim 11, wherein the plurality of pixel areas includes a first pixel area having a first light emitting area and a first circuit area, and a second pixel area having a second light emitting area and a second circuit area, wherein the first pixel area and the second pixel area are adjacent to each other in one of the first direction and the second direction, wherein the first circuit area and the second circuit area are located adjacent to each other and are both between the first light emitting area and the second light emitting area.

17. The display device according to claim 16, wherein one of the first line areas is between the first circuit area and the second circuit area, wherein two of the first lines are located in the one of the first line areas, and wherein one of the two first lines is connected to a first circuit in the first circuit area, and the other of the two first lines is connected to a second circuit in the second circuit area.

18. The display device according to claim 11, wherein the touch panel further includes:

a plurality of first connection patterns, each respectively connected to two or more of the first touch electrodes to electrically connect the two or more respective first touch electrodes to each other; and a plurality of second connection patterns, each respectively connected to two or more of the second touch electrodes to electrically connect the two or more respective second touch electrodes to each other, wherein each first connection pattern and the two or more respective first touch electrodes connected thereto form a first touch channel, and wherein each second connection pattern and the two or more respective second touch electrodes connected thereto form a second touch channel.

19. The display device according to claim 11, wherein the touch panel further includes a dielectric layer between at least one of the first touch electrodes and at least one of the second touch electrodes, wherein the at least one of the first touch electrodes and the at least one of the second touch electrodes are disposed directly on a same underlying layer, and wherein the dielectric layer separates the at least one of the first touch electrodes from the at least one of the second touch electrodes where the at least one of the first touch electrodes cross the at least one of the second touch electrodes.

20. The display device according to claim 19, wherein the at least one of the first touch electrodes includes a first division pattern, a second division pattern, and a bridge electrically connecting the first division pattern to the second division pattern, wherein the at least one of the second touch electrodes is disposed between the first division pattern and the second division pattern, and directly on the same underlying layer as at least one of the first division pattern and the second division pattern, and wherein the dielectric layer is on the at least one of the second touch electrodes, and the bridge is on the second touch electrode.

* * * * *